United States Patent [19]
Adams et al.

[11] Patent Number: 5,987,568
[45] Date of Patent: *Nov. 16, 1999

[54] APPARATUS AND METHOD FOR OPERABLY CONNECTING A PROCESSOR CACHE AND A CACHE CONTROLLER TO A DIGITAL SIGNAL PROCESSOR

[75] Inventors: Phil Adams, Salt Lake City; Kenneth Morely, Draper; Randy C. Rollins, West Jordan; Kurt Dobson, Sandy, all of Utah

[73] Assignee: 3Com Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,068

[22] Filed: May 8, 1997

Related U.S. Application Data

[60] Provisional application No. 60/035,798, Jan. 10, 1997.

[51] Int. Cl.⁶ .............................. G06F 12/00; G06F 13/00
[52] U.S. Cl. .......................... 711/118; 711/102; 711/104; 711/147; 712/34; 712/35
[58] Field of Search ................................ 711/3, 102, 104, 711/118, 147, 154; 395/200.38, 800.34, 800.35, 281, 306, 282; 463/44, 45

[56] References Cited

U.S. PATENT DOCUMENTS

| | | | |
|---|---|---|---|
| 4,799,144 | 1/1989 | Parruck et al. | 395/822 |
| 5,261,113 | 11/1993 | Jouppi | 395/800.08 |
| 5,293,588 | 3/1994 | Satoh et al. | 704/233 |
| 5,353,415 | 10/1994 | Wolford et al. | 395/306 |
| 5,388,841 | 2/1995 | San et al. | 463/44 |
| 5,392,407 | 2/1995 | Heil et al. | 395/293 |
| 5,438,670 | 8/1995 | Baror et al. | 711/3 |
| 5,459,486 | 10/1995 | Iverson et al. | 345/153 |
| 5,546,547 | 8/1996 | Bowes et al. | 395/294 |
| 5,596,731 | 1/1997 | Martinez, Jr. et al. | 711/122 |
| 5,611,071 | 3/1997 | Martinez, Jr. | 711/133 |

OTHER PUBLICATIONS

Yamauchi et al.; "Architecture and Implementation of a Highly Parallel Single–Chip Video DSP", IEEE vol. 2, No. 2, Jun. 1992; pp. 207–220.

*Primary Examiner*—Tuan V. Thai
*Attorney, Agent, or Firm*—Workman, Nydegger & Seeley

[57] ABSTRACT

A peripheral module capable of interaction with a host system comprises a digital signal processor (DSP), a cache controller, and minimal or no resident memory for initial storage of instructions and data. The peripheral module utilizes the memory resources (e.g., ROM and RAM) of a host system. The cache controller interfaces to the DSP and provides an instruction and data stream, upon request, from a resident cache. A bus interface unit arbitrates access to the host system via a host bus for access to host system resources by the cache controller for extracting DSP information (e.g., instructions and data) from the host system for utilization by the DSP within the peripheral module. The cache controller and cache thereby provide the instruction and data stream as required by the DSP for digital signal processing applications and relieve the need for resident storage within the peripheral module.

26 Claims, 6 Drawing Sheets

APPARATUS AND METHOD FOR OPERABLY CONNECTING A PROCESSOR CACHE AND A CACHE CONTROLLER TO A DIGITAL SIGNAL PROCESSOR

RELATED APPLICATION

This application claims priority to Provisional Patent Application Ser. No. 60/035,798, filed Jan. 10, 1997.

BACKGROUND OF THE INVENTION

1. The Field of the Invention

The field of the invention relates to computer and communication systems having a host system interfacing with support or peripheral modules for performing digital signal processing functions. More specifically, the present invention relates to the minimization of hardware components in computer architectures within peripheral modules. More particularly, the invention relates to independent caching of instructions and/or data from a shared host memory.

2. Present State of the Art

Computer systems originally were self-reliant in performing both computational and peripheral functions. Computer systems processed data as well as generated control signals and performed calculations for causing peripheral modules to react as directed. As peripheral functions, such as digital signal processing, increased in complexity, computer systems became largely distracted from their own computational role by the required burden of providing computational support and control functions to peripheral modules. To combat this problem, peripheral modules were designed with additional sophistication.

Modern peripheral modules such as digital signal processing modules and other devices incorporate many of the attributes of computer systems themselves. For example, peripheral modules incorporate digital signal processors and on-board memory devices such as ROMs and RAMs. Such configured peripheral modules became autonomous yet focused in carrying out a specific objective such as filtering and conditioning signals, generating waveforms, and other functions.

Although these modem systems perform focused, independent, digital signal processing functions, such peripheral modules still rely on a computer system or a host system to provide control, data, or information for processing. For example, peripheral modules having a digital signal processor may rely upon a host computer to generate control signals or deliver data for encoding or modulating.

To facilitate the transfer of data between a host system and a peripheral system, interface standards have been established. Both a host system and a peripheral module incorporate these standards into their interfaces for compliant interaction therebetween. Such peripheral modules electrically connect to the host system according to a defined interface. Such interfaces include parallel and serial interfaces and take specific forms such as Universal Serial Bus (USB), PCMCIA, as well as other interface standards.

Peripheral modules taking the form of extended processing systems such as modems, traditionally operate as dedicated systems having resident processing and memory resources. Additionally, peripheral modules may couple to a host system bus through a bus interface unit that provides a compatible loading and electrical interface with the host bus. Traditional host bus configurations subordinate peripheral modules to host processor control (ie., the host processor operates as the host bus master while interfacing with peripheral modules). Peripheral modules requesting access to the host bus must initially assert this request in a form such as a direct memory access (DMA) request.

Traditionally, such a master/slave interface between a peripheral module and host bus have been impractical for continuous and substantial transfer of information due to bus architectures and disparate performance of digital signal processor and host system resources. For example, a peripheral module having a digital signal processor may be operating on 10 nanosecond clock rates while host system resources such as memory may only be capable of functioning at access rates on the order of 100 nanoseconds. Because of such a throughput disparity, peripheral modules were required to incorporate their own support resources such as memory devices onto a bus local to the peripheral module. Such a peripheral-resident bus incorporated data and program storage for use by the peripheral module. Incorporation of additional program and data storage (e.g., ROM and RAM) onto a peripheral module significantly increases the cost of the peripheral module.

In addition to the increased cost of a peripheral module, replication of existing types of resources (e.g., ROM and RAM) on the peripheral module increases the overall "footprint" (i.e., the necessary area for routing and placement of components) of the peripheral module. FIG. 1 represents a prior art configuration of a host system 100 comprising a host processor 102 operably coupled to a ROM 106 and RAM 108. ROM 106 provides program instructions and data to host processor 102 via host bus 104. RAM 108 also provides instructions and data to host processor 102 via host bus 104.

Optional configurations of host processor system 100 also comprise a caching configuration for improved efficiency of host processor 102 through pre-fetching instructions and data. Such configurations employ a cache controller 110 operably coupled to host bus 104 for pre-fetching instructions and data for storage in a high speed memory device such as a cache 112. Cache 112 operably couples to host processor 102 through cache controller 110 and a host cache bus 114.

Still referring to FIG. 1, prior art configurations of host systems 100 optionally comprise a bus interface unit (BIU) 116 operably coupled to host bus 104. BIU 116 provides operable coupling of a peripheral module 118 to interface with host system 100. Alternative prior art embodiments have physically placed BIU 116 within peripheral module 118 or required a mating bus interface module on both the host side of the interface and the peripheral side of the interface. Regardless of the actual location of BIU 116, both configurations perform similarly by accommodating interaction between master-configured host system 100 and slave-configured peripheral module 118.

By way of example, peripheral module 118 comprises a digital signal processor 120 operably coupled to a dedicated peripheral ROM 122 and peripheral RAM 124 through an independent peripheral bus 126. Peripheral ROM 122 and peripheral RAM 124 have comprised program instructions and data specific to the operation of digital signal processor 120. Because of the inherent computation-intensive and/or continuous processing of digital signal processor 120, accessible and available storage for digital signal processor 120 is desirable. Slave-configured peripheral module 118, in prior art configurations, is unable to maintain sufficient information exchange rates with host system 100 for providing instructions and data due to bus architectures and disparate performance of digital signal processor and host system resources. Thus, prior art configurations have required dedicated resident storage devices sufficiently sized for autonomous program and data storage and retrieval to be collocated with digital signal processor 120.

In conclusion, there exists a need for an apparatus and a method of providing instructions and/or data to a digital signal processor in a peripheral module without requiring substantial resident dedicated storage in the peripheral module.

SUMMARY AND OBJECTS OF THE INVENTION

It is, therefore, an object of the present invention to allow a peripheral module having a digital signal processor to operate from instructions and data not initially resident within the peripheral module.

It is another object of the present invention to allow a digital signal processor to operably function in a peripheral module having no dedicated resident memory for initial storage of instructions and data.

It is yet another object of the present invention to allow a peripheral module to effectively utilize and share portions of the memory resources of a host system for execution by a digital signal processor within a peripheral module.

It is another object of the present invention to provide a system wherein a host system may effectively accommodate memory requirements of a peripheral module by granting control and access to host system resources, such as memory, for the beneficial use of peripheral modules.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus and method for operably coupling a processor cache with a digital signal processor resident within a peripheral module is presented.

The present invention may incorporate a communication channel between a host system and a peripheral module electrically connected to the host system. The peripheral module may directly couple to the host system and share, for example, the same power supply to power the circuitry, however, the peripheral module exhibits independent execution of instructions and data in carrying out signal processing objectives. The peripheral module may in fact couple to the host system by way of a standard interface such as a Peripheral Interface Component (PCI), CardBus, or NuBus interface or interfacing may be accomplished by way of custom interfaces unique to a specific application of the present invention. Standard interfaces provide defined contact connections, signal timing and level requirements thereby making it possible for information to be exchanged between the host system and a peripheral module. The peripheral module may additionally interface using serial interface techniques such as Universal Serial Bus (USB), Small Computer Serial Interface (SCSI), Firewire, or other techniques. Such interfaces, whether serial or parallel, facilitate the transfer and exchange of information including instructions and data between a host system and a peripheral module. Furthermore, since the peripheral module relies upon the memory resources of the host system for its primary source for instructions, configurations of digital signal processors may be simplified.

One exemplary embodiment of the present invention operably couples a peripheral module having a digital signal processor with a host system (e.g., a personal computer) having a host processor and dedicated memory resources such as ROM and RAM. Those skilled in the art appreciate that host processors, typically microprocessors or microcontrollers, couple to memory resources such as ROM and RAM via a host bus such as ISA, EISA, or PCI to name a few. Interfacing a peripheral module with the memory resources of a host system requires compatible interaction as introduced above. Compatible interaction is accommodated, in the preferred embodiment, by employing a bus interface unit within the host system and, additionally, a complimentary bus interface unit within the peripheral module. The peripheral module may therefore interface with the memory resources of the host system using the compatible communication channel established therebetween.

Additionally, the interface between the host system and the peripheral module permits access by the peripheral module to the resources of the host system such as access to the memory resources of the host system. Such access enables the peripheral module to gain access to execution instructions and operate on data that initially may not have been present in the peripheral module. In effect, a host system shares or partitions host memory resources with a peripheral module that accesses these resources through a bus interface unit. Furthermore, peripheral modules containing a digital signal processor operate at very high execution rates, and therefore demand instructions and data to be present and available for carrying out the signal processing objectives of the peripheral modules.

One application of such an exemplary embodiment creates a peripheral module having a digital signal processor for performing and controlling assigned signal processing functions without the need to incorporate dedicated ROM and RAM into the peripheral module. Such a configuration provides a reduction in components and, particularly, expensive large components such as RAM and ROM. Additionally, complexity, size, power, heat, and costs associated with peripheral modules are thereby reduced. Yet another benefit is that generally prevalent resources within the host system such as ROM and RAM may be further utilized by a peripheral module, thus potentially reducing the cost and complexity associated specifically with peripheral modules and generally with installations having both a host system coupled to peripheral modules.

A configuration for providing instructions and data to a peripheral module wherein the peripheral module comprises minimal or no resident memory for continued storage of instructions and data is described. The peripheral module comprises a bus interface unit, a cache controller, and a cache. A bus interface unit may be independent of the host system thereby interfacing a host system with the peripheral module or, alternatively, the host system may incorporate a bus interface unit or a portion of a shared bus interface unit. The cache controller operably couples to the digital signal processor and is adapted to manage instructions and data from the memory resources of the host system.

While the exemplary embodiment shows a peripheral module having no resident ROM or RAM, alternative embodiments of the present invention show a peripheral module incorporating a minimal amount of memory for local and temporary storage. By reducing the amount of resident memory required for peripheral modules, the overall complexity, size, power requirements, heat dissipation, and price of peripheral modules may be reduced.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As used herein, the term "digital signal processor (DSP)" refers to any known processor or controller for executing dedicated computationally intensive processes. The DSP may be any microprocessor, microcontroller, embedded processor, or other programmable or configurable execution device. This use of the term "DSP" is shown by way of example and not by limitation and those skilled in the art will undoubtedly understand and appreciate various different computational devices that are equally within the contemplation of the use of the term.

As used herein, the term "host system" refers to a mechanized computation device that executes programmed instructions, generally software, and provides expansion mechanisms for interfacing with the system. Such interfacing access points may be enabled by providing access to a common bus system within the host system. This use of the term "host system" is employed by way of example and those skilled in the art may also know of other interfacing or interacting mechanisms that are also contemplated within the scope of the present invention.

Figure 1:
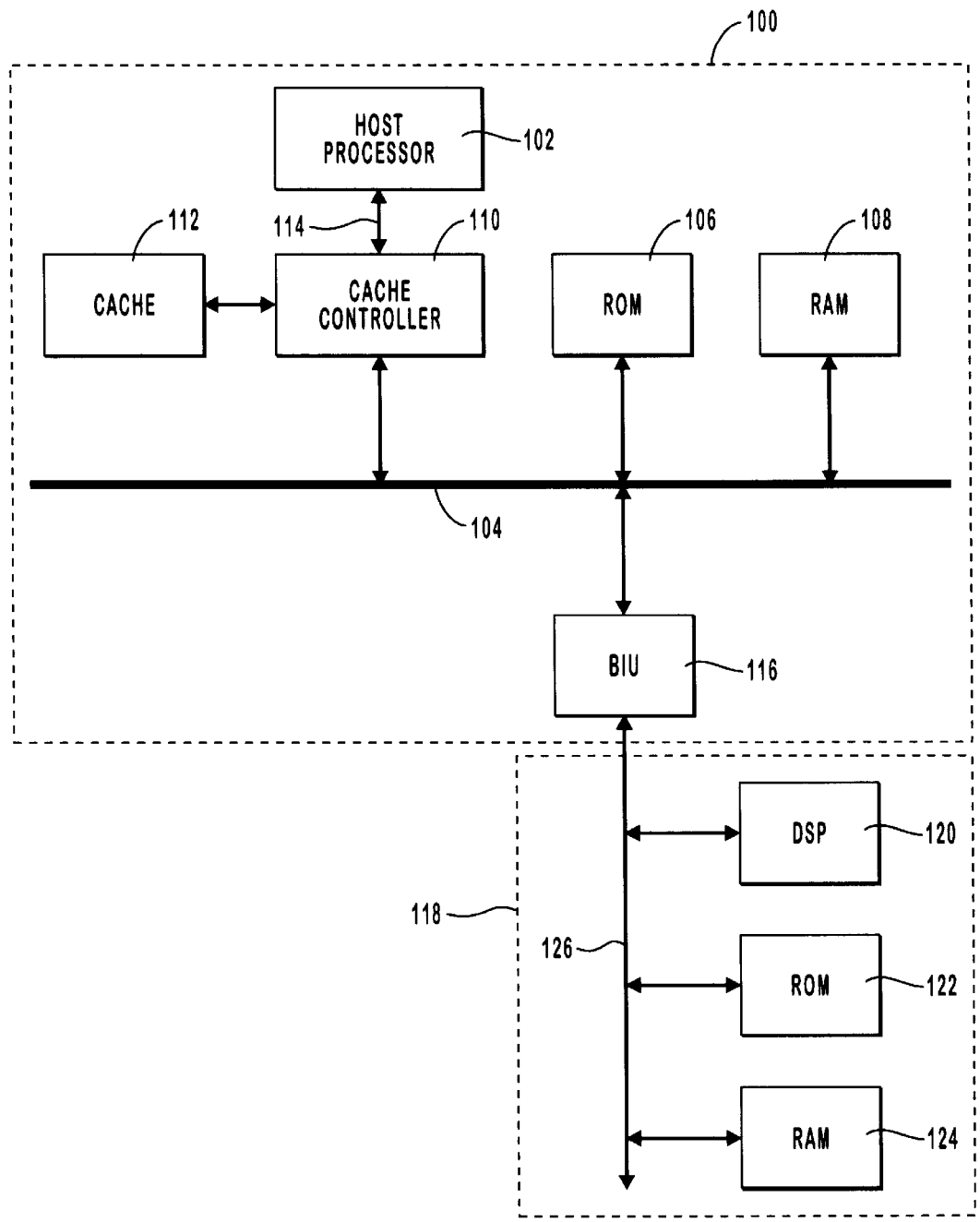
FIG. 1 is a functional block diagram of a prior art configuration for interfacing peripheral modules with a host system.

FIG. 1, as described above, is a functional block diagram of the prior art configuration of a host system 100 coupled to a peripheral system 118. Prior art peripheral system 118 required dedicated resident memory resources (e.g., ROM 122 and RAM 124) for providing instructions and data to digital signal processor 120.

Figure 2:
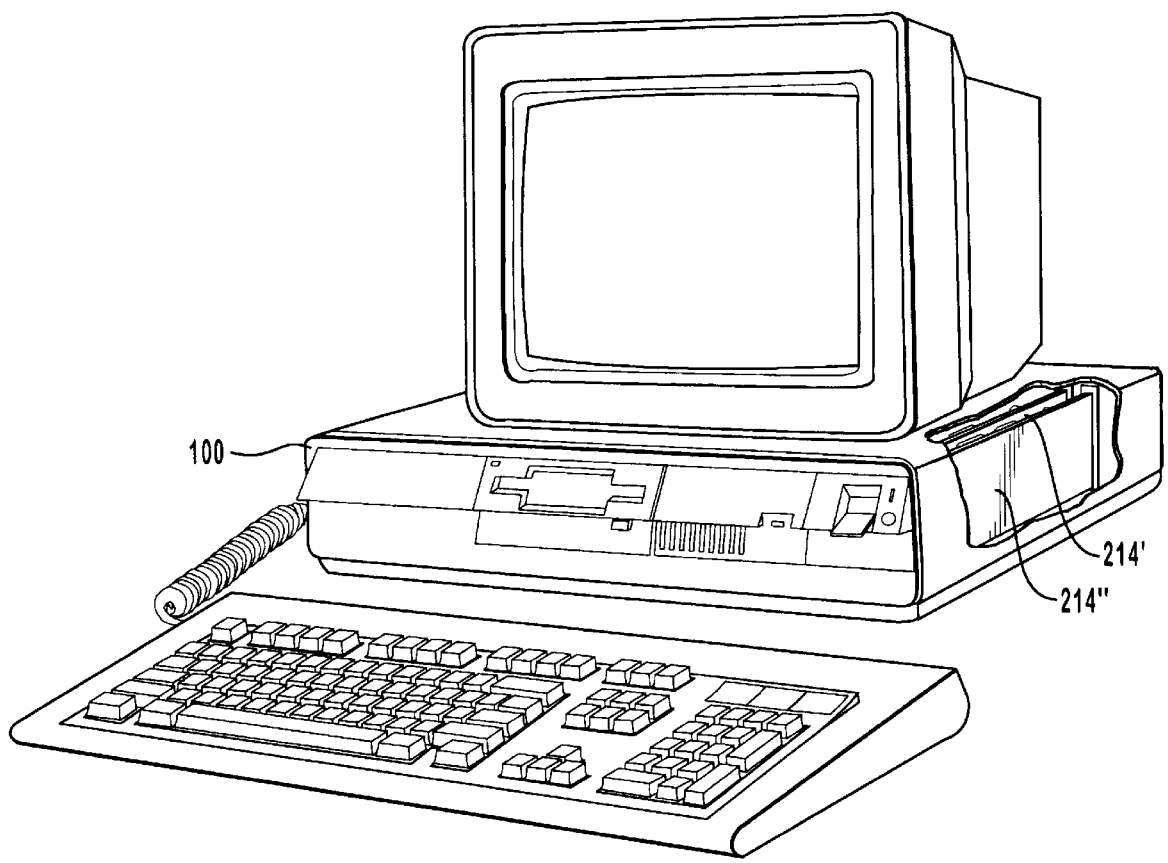
FIG. 2 is a diagram of a host system configured with a plurality of peripheral modules for performing digital signal processing functions as directed by the host system.
Figure 3:
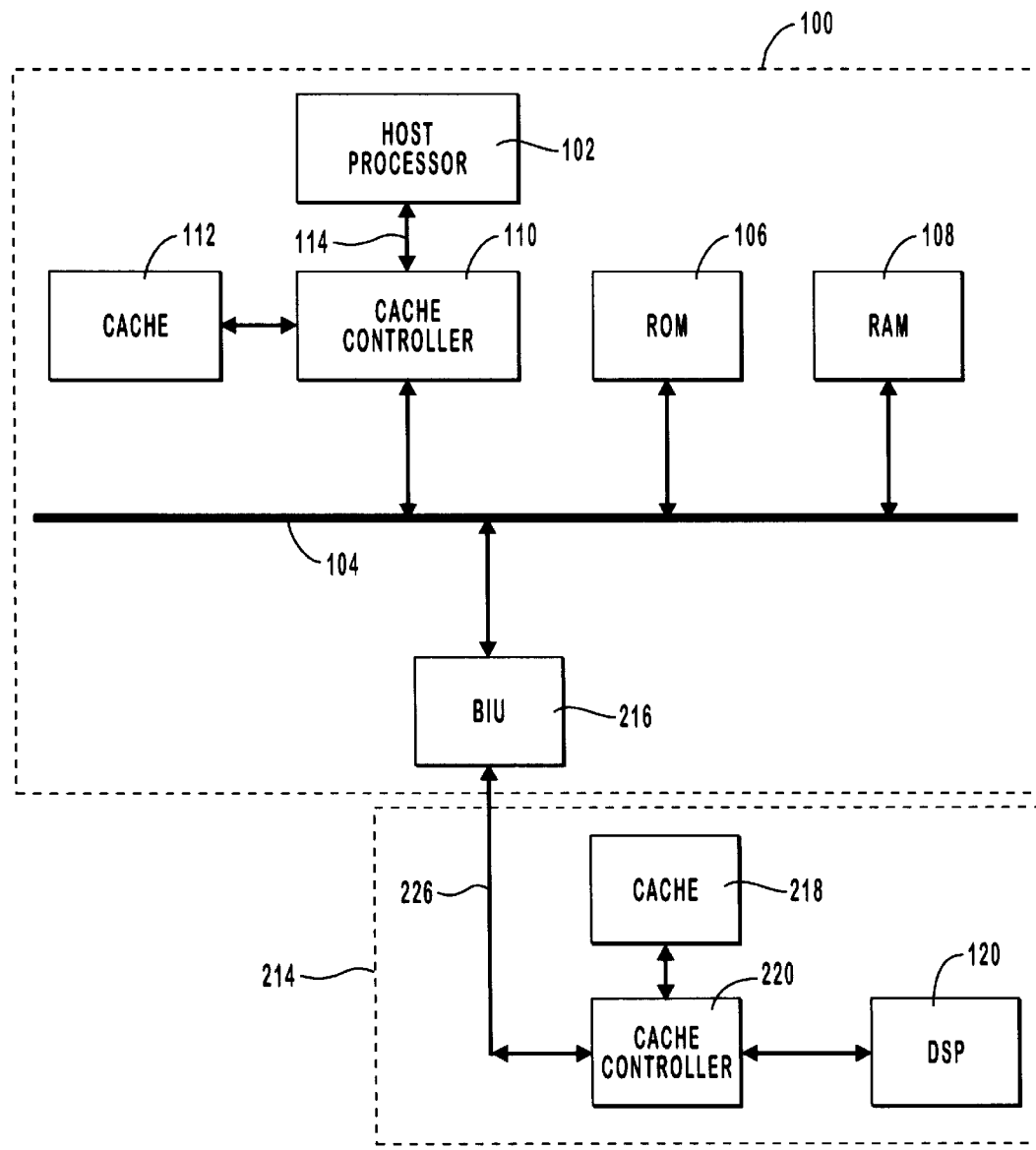
FIG. 3 is a functional block diagram of a configuration for providing information to a peripheral module comprising a digital signal processor wherein the peripheral module maintains no resident memory, in accordance with one embodiment of the present invention.

FIG. 2 is a diagram of a host system configured with a plurality of peripheral modules for performing digital signal processing functions as directed by the host system. A host system 100 generally provides the point of interface for human interaction or intervention. In FIG. 2, host system 100 is depicted as a personal computer capable of being programmed and configured to execute tasks as directed or requested by a user. Host system 100 provides an architecture capable of interaction with a myriad of other devices such as a plurality of peripheral modules 214. FIG. 2 depicts modem cards 214', and 214" as examples of peripheral modules 214 (FIG. 3). As peripheral modules have increased in capability and complexity, peripheral modules have incorporated increased functionality such as dedicated DSPs, controllers, and memory resources. While peripheral modules have increased in autonomy, they remain substantially controlled and directed by host system 100. In fact, peripheral modules typically sit idle until directed to perform their indigenous role.

FIG. 3 is a functional block diagram of a configuration for providing information to a peripheral module 214 comprising among other things a DSP 120. In the preferred embodiment, peripheral module 214 maintains no resident memory for the initial storage of instructions or data. Peripheral module 214 may take the form of peripherals described above such as digital filters, modems, modulators, and other peripheral devices known to perform dedicated digital signal processing functions. A host system 100 comprises a host processor 102, ROM 106, and RAM 108 coupled together through a host bus 104. Host system 100 executes programming instructions as derived from ROM 106 and RAM 108.

Host system 100 may additionally employ other enhancement techniques such as incorporation of a cache 112 as managed by a cache controller 110. Host system 100 preferably is a well known computational device such as a personal computer. Personal computers are well known as host devices because of their ability to interface with humans and have become a host or master for controlling various peripheral modules and devices.

Peripheral modules may operate at a location remote from host system 100. To facilitate remote operation, transmission of instructions and data may be facilitated by the use of a communication channel (not shown). Communication over an extended link or channel may place additional considerations upon host system 100 and peripheral system 214 such as transmission protocols and mediums. A bus interface unit may operably interface host bus 104 with a communication channel by maintaining and adhering to operational requirements of host bus 104. Bus interface unit 216 preferably is physically associated with host system 100. Bus interface unit 216 complies with host bus 104 system requirements. Bus interface unit 216 functionally controls or interacts with host bus 104 which is preferably a bus standard such as a peripheral component interface (PCI), Nu BUS, or other bus configurations whereby bus control may be shared, distributed, or otherwise granted to various resources one of which is host processor 102. For peripheral modules adapted to sustain lower processing rates, other internal bus structures such as ISA, EISA, or other non-shared bus architectures may suffice and provide sufficient throughput of instructions and data to peripheral module 214. However, for peripheral modules having demanding informational throughput requirements, higher-speed shared bus configurations are desirable. Furthermore, to enhance transmission of instructions and data from host system 100 to peripheral module 214, a bus interface unit 216 preferably is implemented as state controlled logic hardware, however, nothing prevents bus interface unit 216 from being under program control when informational exchange rates meet the requirements of peripheral module 214.

Peripheral module 214 is further comprised of a cache controller 220 operably coupled to bus interface unit 228 via peripheral bus 226. Cache controller 220 requests information in the form of instructions and data for consumption by DSP 120 via bus interface unit 216. Bus interface unit 216 and cache controller 220 function in concert to receive instructions and data from memory resources (e.g., ROM 106 and RAM 108) of host system 100 via host bus 104. Those skilled in the art will appreciate that the functionality of bus interface unit 216 and cache controller 220 may be physically merged or integrated into a single operative device capable of interacting with host system 100. Cache controller 220, upon careful management and monitoring of data and instructions resident within cache 218, requests additional information from host system 100. By employing cache 218 and cache controller 220 for providing instructions and data to DSP 120, instructions and data resident on host system 100 may be buffered and available for timely execution by DSP 120.

Still referring to FIG. 3, an external cache also known as a level 2 (L2) cache is comprised of a high speed RAM device (e.g., SRAM) as opposed to a slower memory device. Memory caching is effective, for among other reasons, because programs frequently access the same data or instructions repetitively. Therefore, by keeping much of the frequently accessed information in a higher speed memory device such as cache 218, DSP 120 may more efficiently access instructions and data. In the preferred embodiment of the present invention as illustrated in FIG. 3, peripheral module 214 comprises no additional memory resources such as resident ROM or RAM for storing instructions and data. In the present invention, cache controller 220 supplies instructions and data to DSP 120 as requested and received from host system 100. Furthermore as long as cache controller 220 adequately requests and receives information from host system 100 via bus interface unit 216, DSP 120 may operate at speeds equivalent or similar to prior art applications incorporating resident RAM and ROM.

Those familiar with caching technology will recognize that when DSP 120 locates an instruction or data in cache 218, performance may be enhanced due to the faster access times of cache 218. Thus, efficiencies and effectiveness of caching technologies are judged or rated according to successful accesses or "hit rates." In the present invention, when an instruction or data is not resident in cache 218, generally occurring when programming instructions branch or jump to other program blocks, performance may be slightly degraded due to the access times associated with retrieving information from the memory resources of host system 100. However, modern higher speed communication channels have minimized this degradation in performance and have therefore contributed to the feasibility of the present invention.

Still referring to FIG. 3, cache 218 preferably couples to cache controller 220 thus providing access to information by DSP 120 via cache controller 220. Cache 218 may be directly coupled to DSP 120 thus presenting a native memory interface to DSP 120. Yet other alternative configurations of coupling cache 218 with DSP 120 may include, but are not limited to, the use of dual-port memory configurations, content addressable techniques, and pseudo-content addressable techniques. In the preferred embodiment, cache 218 is configured as a faster technology device such as an SRAM, however, other access technologies are contemplated by the present invention.

DSP 120 operably couples to cache 218 via cache controller 220 and alternatively may couple directly with cache 218 as described above. In the preferred embodiment, DSP 120 operates in a native mode and interfaces to cache 218 via cache controller 220. The coupling of DSP 120 with cache controller 220 occurs via traditional address/data/control signals associated with DSP 120. DSP 120 functionally performs peripheral digital signal processing operations according to instructions and data retrieved from cache 218.

Although peripheral module 214 has been described according to discrete blocks including DSP 120, cache controller 220, and cache 218, these divisions are functional and integration is fully anticipated as being within the scope of the present invention. For example, incorporation of bus interface unit 216 with cache controller 220 into a custom integrated logic device providing minimization of circuitry is contemplated. Additionally, DSP 120 and cache 218 may be in the form of logic cores facilitating integration and incorporation with other functional devices.

Figure 4:
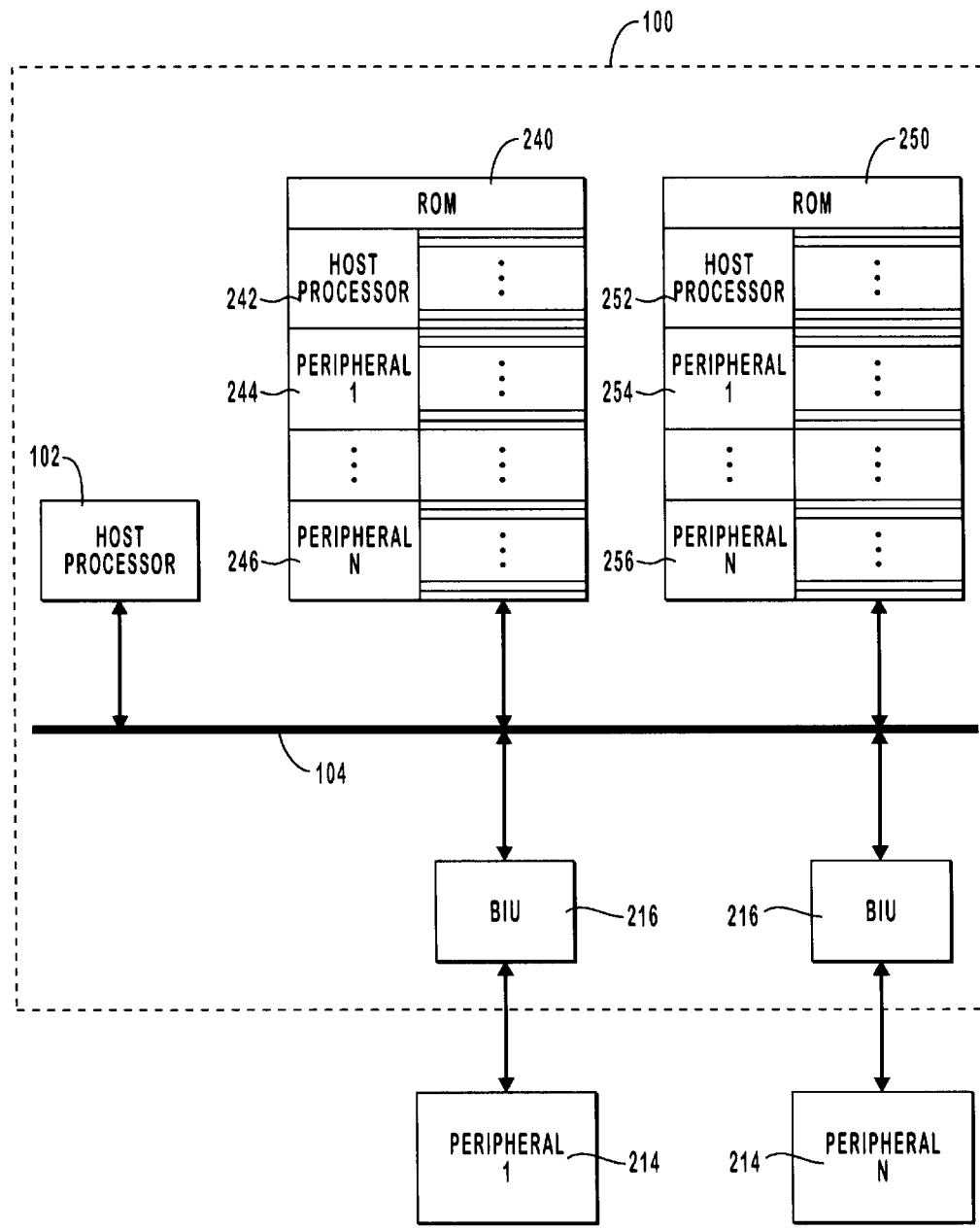
FIG. 4 is a functional diagram of a host system configured with a shared memory architecture for providing instructions and data to peripheral modules, in accordance with is a preferred embodiment of the present invention.

FIG. 4 is a functional diagram of a host system configured with a shared memory architecture for providing instructions and data to peripheral modules in accordance with a preferred embodiment of the present invention. As described above, host system 100 comprises memory resources, namely ROM 240 and RAM 250 operably coupled to host processor 102 via host bus 104. In the preferred embodiment, at least one peripheral module 214 couples to host system 100 via bus interface unit 216, however, FIG. 4 depicts more than one peripheral module 214 interfacing with host system 100 for providing peripheral services or functions which is considered within the scope of the present invention.

In the present invention, memory resource (e.g., ROM 240 and RAM 250) of host system 100 are partitioned to provide memory resources to host processor 102 and peripheral modules 214. In the preferred embodiment, ROM 240 is partitioned into a host processor ROM portion 242 for providing read-only instructions and data for execution by host processor 102. Additionally, ROM 240 is further partitioned into peripheral module ROM portions 244 and optionally 246 when more than one peripheral module 214 is present Peripheral module ROM portions 244 (and 246 when a plurality of peripheral modules are incorporated) provide instructions and data for execution by peripheral module 214 when retrieved and requested by peripheral module 214 via bus interface unit 216.

Likewise, RAM 250 is partitioned into a host processor RAM portion 252 for providing instructions and data for execution by host processor 102. Additionally, RAM 250 is further partitioned into peripheral module RAM portions 254 and optionally 256 when more than one peripheral module 214 is present. Peripheral module RAM portions 254 (and 256 when a plurality of peripheral modules are incorporated) provide instructions and data for execution by peripheral module 214 when retrieved and requested by peripheral module 214 via bus interface unit 216.

Alternate embodiments of the present invention contemplate the selective partitioning of either ROM 240 or RAM 250 as suited for storage of instructions and data for peripheral modules 214. For example, peripheral module 214 may incorporate minimal memory such as resident boot-up ROM for performing primitive initialization instructions followed by reliance upon host memory resources. Alternatively, in applications of the present invention where host system 100 takes the form of a personal computer, when low or no memory peripheral modules 214 are connected, it may be impractical or often infeasible to expect that a ROM 240 would be originally partitioned, prior to installation, with peripheral module specific instructions and data. The present invention contemplates that peripheral-specific instructions and data may be transferred from an information storage resource such as a hard disk drive or a floppy diskette to RAM 250 when a peripheral module is detected or when peripheral services or functions are either requested by a user via host system 100 or independently by host system 100 when under program control. In such a scenario, host system 100 partitions RAM 250 into peripheral module RAM portions 254 and transfers peripheral module specific information thereto. It is further contemplated that peripheral module 214 utilizes peripheral module RAM portions 254 for writeable storage of data such as interim products and data.

Figure 5:
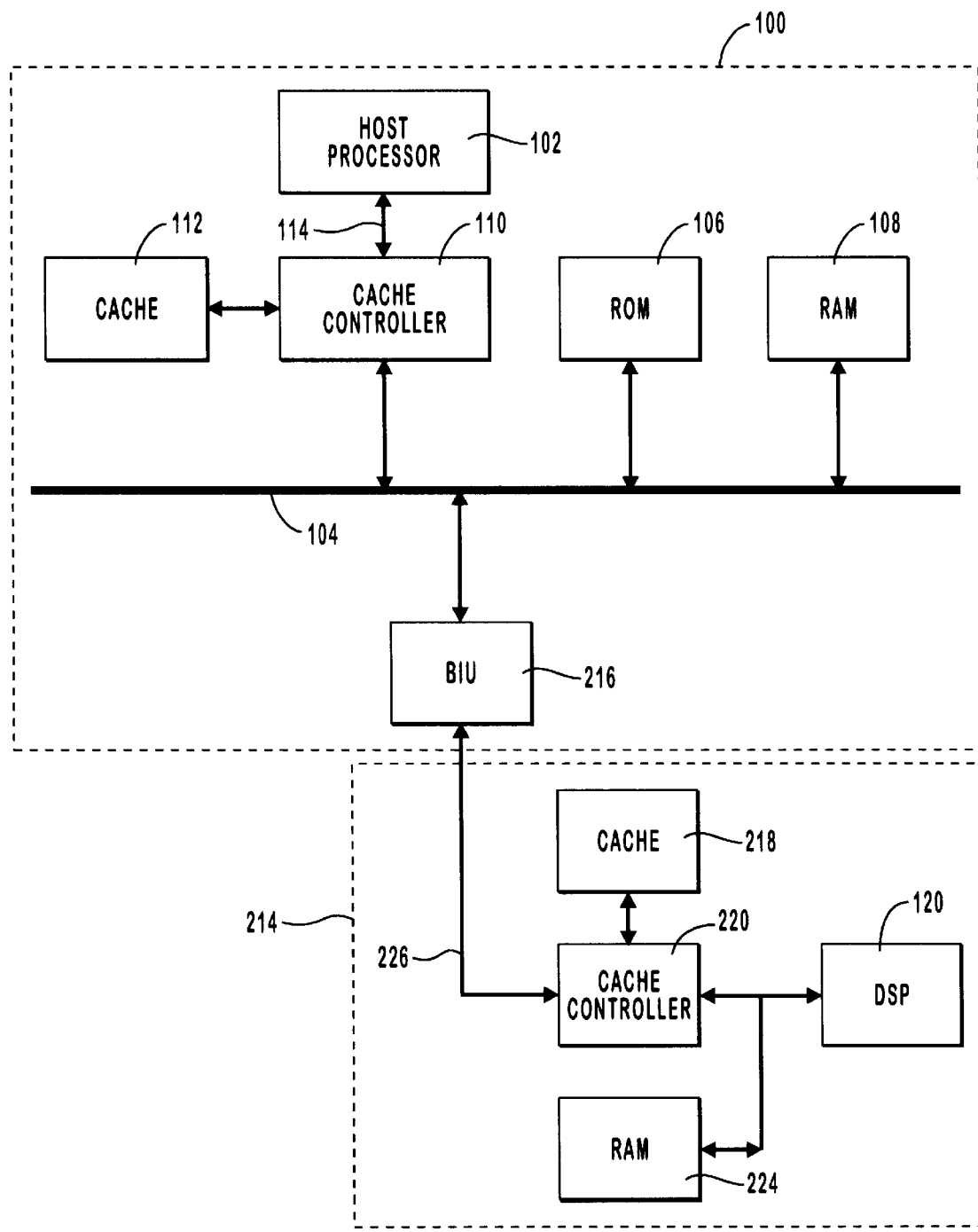
FIG. 5 is a functional block diagram of a configuration for providing information to a peripheral module comprising a digital signal processor wherein the peripheral module maintains minimal resident memory, in accordance with another embodiment of the present invention.

FIG. 5 is a functional block diagram of the configuration for providing information to a peripheral module comprising a DSP wherein the peripheral module maintains minimal resident memory, in accordance with another embodiment of the present invention. In the present alternative embodiment, peripheral module 214 further comprises minimal resident memory in the form of a peripheral RAM 224. Peripheral RAM 224 provides minimal local storage for execution by DSP 120. A variety of peripheral processing functions may require enhanced memory requirements such as for the interim storage of intermediate computational products. In the present embodiment, storage of intermediate products, for example, may be performed in a lower performance memory device such as a dynamic memory (DRAM) or other technologies rather than a higher performance cache 21. Inclusion of minimal memory within peripheral module 214 may contribute to an increase in size and cost of peripheral module 214, however, such increases are offset by the utilization of memory resources of host system 100 for the majority of information storage and retrieval.

Figure 6:
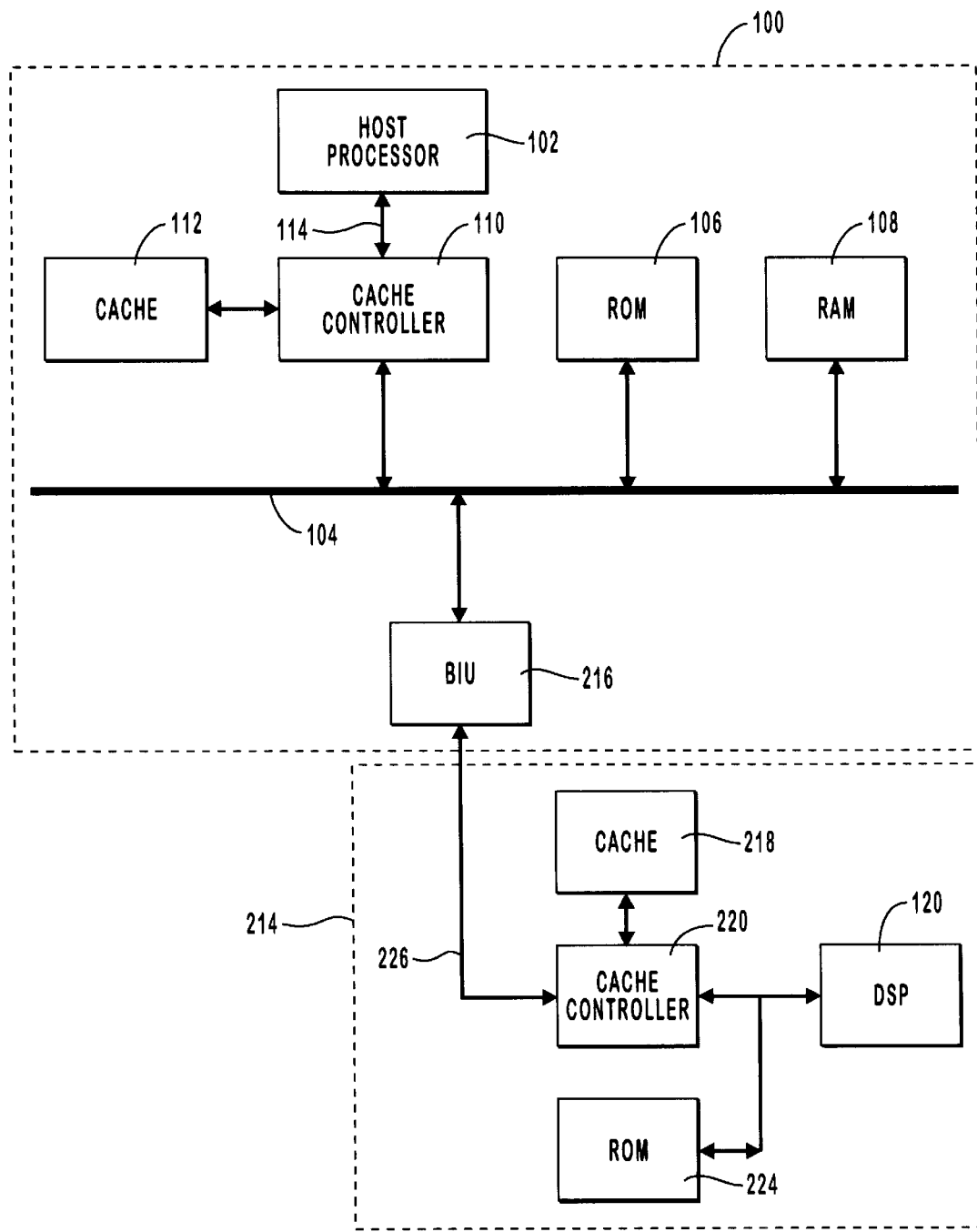
FIG. 6 is a functional block diagram of a configuration for providing information to a peripheral module comprising a digital signal processor wherein the peripheral module maintains minimal resident memory, in accordance with yet another embodiment of the present invention.

FIG. 6 is a functional block diagram of the configuration for providing information to a peripheral module comprising a DSP wherein the peripheral module maintains minimal resident memory, in accordance with yet another embodiment of the present invention. In the present alternative embodiment, peripheral module 214 further comprises minimal resident memory in the form of a peripheral ROM 228 that provides minimal local read-only storage for execution by DSP 120. A variety of digital signal processing functions or configurations may benefit from minimal local storage of data such as coefficients, constants, routines, algorithms, and other regularly accessed data.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system comprising a host system including a memory and a host bus, and a peripheral module with a digital signal processor (DSP), an apparatus through which said DSP receives run-time execution instructions and data, said apparatus comprising:

a bus interface unit operably coupled to said host bus and adapted to operably interface said peripheral module with said host bus;

a peripheral bus coupled to said bus interface unit;

a cache controller operably coupled to said bus interface unit via said peripheral bus, said cache controller also operably coupled to said DSP and adapted to pre-fetch and manage said execution instructions and data from said memory of said host system, said execution instructions and data being resident and stored in said memory of said host system until pre-fetched by said cache controller for utilization by said DSP; and a cache operably coupled to said cache controller for storing said execution instructions and data for use by said digital signal processor from said memory of said host system.

2. The apparatus as recited in claim 1 wherein said bus interface unit further comprises a means for receiving master control of said host bus.

3. The apparatus as recited in claim 2 wherein said bus interface unit is configured to a NuBus standard.

4. The apparatus as recited in claim 2 wherein said bus interface unit is configured to a PCI standard.

5. The apparatus as recited in claim 1 wherein said memory of said host system is random access memory (RAM) and said peripheral module further comprises a read only memory (ROM) operably coupled to said peripheral bus.

6. The apparatus as recited in claim 1 wherein said host system is a personal computer.

7. The apparatus as recited in claim 1 wherein said cache is integral with said cache controller.

8. The apparatus as recited in claim 1 wherein said cache and said cache controller are integral with said DSP.

9. A system through which a digital signal processor (DSP) receives run-time execution instructions and data, comprising:

a host system including a memory and a host bus; and a peripheral module including said DSP and further comprising:

a bus interface unit operable coupled to said host bus and adapted to operably interface said peripheral module with said host bus;

a peripheral bus coupled to said bus interface unit;

a cache controller operably coupled to said bus interface unit via said peripheral bus, said cache controller also operably coupled to said DSP and adapted to pre-fetch and manage said execution instructions and data from said memory of said host system, said execution instructions and data being resident and stored in said memory of said host system until pre-fetched by said cache controller for utilization by said DSP; and a cache operably coupled to said cache controller for storing said execution instructions and data for use by said digital signal processor from said memory of said host system.

10. The system as recited in claim 9 wherein said bus interface unit further comprises a means for receiving master control of said host bus.

11. The system as recited in claim 10 wherein said bus interface unit is configured to a NuBus standard.

12. The system as recited in claim 10 wherein said bus interface unit is configured to a PCI standard.

13. The system as recited in claim 9 wherein said memory of said host system is random access memory (RAM) and said peripheral module flier comprises a read only memory (ROM) operably coupled to said peripheral bus.

14. The system as recited in claim 9 wherein said host system is a personal computer.

15. The system as recited in claim 9 wherein said cache is integral with said cache controller.

16. The system as recited in claim 9 wherein said cache and said cache controller are integral with said DSP.

17. In a system comprising a host system including a memory and a host bus, a peripheral module adapted to receive run-time execution instructions and data from said memory of said host system comprising:

a digital signal processor (DSP);

a bus interface unit operably coupled to said host bus and adapted to operably interface said peripheral module with said host bus;

a peripheral bus coupled to said bus interface unit;

a cache controller operably coupled to said bus interface unit via said peripheral bus, said cache controller also operable coupled to said DSP and adapted to pre-fetch and manage said execution instructions and data from said memory of said host system, said execution instructions and data being resident and stored in said memory of said host system until pre-fetched by said cache controller for utilization by said DSP; and a cache operably coupled to said cache controller for storing said execution instructions and data for use by said digital signal processor from said memory of said host system.

18. The peripheral module as recited in claim 17 wherein said bus interface unit further comprises a means for receiving master control of said host bus.

19. The peripheral module as recited in claim 18 wherein said bus interface unit is configured to a NuBus standard.

20. The peripheral module as recited in claim 18 wherein said bus interface unit is configured to a PCI standard.

21. The peripheral module as recited in claim 17 wherein said memory of said host system is random access memory (RAM) and said peripheral module further comprises a read only memory (ROM) operably coupled to said peripheral bus.

22. The peripheral module as recited in claim 17 wherein said host system is a personal computer.

23. The peripheral module as recited in claim 17 wherein said cache is integral with said cache controller.

24. The peripheral module as recited in claim 17 wherein said cache and said cache controller are integral with said DSP.

25. A method of operation of a peripheral module according to data initially non-resident at said peripheral module, said peripheral module having a digital signal processor (DSP), a cache controller and a cache, said peripheral module being associated with a host system having a memory and a host bus, said method comprising the steps of:

said peripheral module requesting access to said host bus;

granting access to said host bus by said host system;

when said host system permits access by said peripheral module, said cache controller fetching said data for said DSP from said memory of said host system;

storing said data from said memory of said host system in said cache of said peripheral module; and said DSP executing said data from said cache.

26. A method of operation of a peripheral module as recited in claim 25 wherein said granting access step comprises the step of granting master control of said host bus to said cache controller.

* * * * *